United States Patent
Valan et al.

(10) Patent No.: US 11,941,267 B2
(45) Date of Patent: Mar. 26, 2024

(54) RESEEDING A MEDIATOR OF A CROSS-SITE STORAGE SOLUTION

(71) Applicant: NetApp, Inc., San Jose, CA (US)

(72) Inventors: Arul Valan, Karnataka (IN); Anoop Vijayan, Karnataka (IN); Akhil Kaushik, Karnataka (IN)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/360,133

(22) Filed: Jul. 27, 2023

(65) Prior Publication Data

US 2023/0367494 A1  Nov. 16, 2023

Related U.S. Application Data

(63) Continuation of application No. 17/219,740, filed on Mar. 31, 2021, now Pat. No. 11,740,811.

(51) Int. Cl.
*G06F 3/00* (2006.01)
*G06F 3/06* (2006.01)

(52) U.S. Cl.
CPC .......... *G06F 3/0631* (2013.01); *G06F 3/0604* (2013.01); *G06F 3/067* (2013.01)

(58) Field of Classification Search
CPC ....... G06F 3/0631; G06F 3/0604; G06F 3/067
See application file for complete search history.

(56) References Cited

U.S. PATENT DOCUMENTS

| | | | |
|---|---|---|---|
| 5,742,792 A | 4/1998 | Yanai et al. | |
| 6,389,551 B1 | 5/2002 | Yount | |
| 6,415,372 B1 | 7/2002 | Zakai et al. | |
| 7,039,827 B2 | 5/2006 | Meyer et al. | |
| 7,500,014 B1 | 3/2009 | Jacobson et al. | |
| 7,631,066 B1 | 12/2009 | Schatz et al. | |
| 7,640,451 B2 | 12/2009 | Meyer et al. | |
| 7,890,626 B1 | 2/2011 | Gadir | |
| 8,498,967 B1 | 7/2013 | Chatterjee et al. | |

(Continued)

OTHER PUBLICATIONS

Co-pending U.S. Appl. No. 17/861,768, inventor Narasingarayanapeta; Krishna Murthy Chandraiah Setty, filed Jul. 11, 2022.

(Continued)

*Primary Examiner* — Craig S Goldschmidt
(74) *Attorney, Agent, or Firm* — Jaffery Watson Mendonsa & Hamilton LLP

(57) ABSTRACT

Systems and methods for making a cross-site storage solution resilient towards mediator unavailability are provided. According to one embodiment, a stretched storage system is operable to bring a mediator associated with a primary and secondary distributed storage system back into the role of an arbitrator for peered consistency groups (CGs). A mediator reseed status indicator is maintained for multiple CGs to identify when the mediator's status information for a CG is stale. When the mediator becomes available and a local CG is identified as the subject of a mediator reseed process, the master node of the primary that hosts a master copy of a dataset for the local CG performs the reseed process, including: (i) causing relationship status information for the local CG to be updated on the mediator to the current state maintained by the primary; and (ii) resetting the mediator reseed status indicator.

20 Claims, 12 Drawing Sheets

(56) References Cited

U.S. PATENT DOCUMENTS

| | | |
|---|---|---|
| 8,645,623 B1 | 2/2014 | O'Shea et al. |
| 8,856,583 B1 | 10/2014 | Msser et al. |
| 8,874,960 B1 | 10/2014 | Khan et al. |
| 9,189,341 B1 | 11/2015 | Natanzon et al. |
| 10,412,066 B1 | 9/2019 | Vemuri |
| 10,496,320 B2 | 12/2019 | Eisler et al. |
| 10,725,691 B1 | 7/2020 | Kaushik et al. |
| 10,761,768 B1 | 9/2020 | Kaushik et al. |
| 11,036,423 B2 | 6/2021 | Kaushik et al. |
| 11,089,105 B1 | 8/2021 | Karumbunathan et al. |
| 11,327,857 B2 | 5/2022 | Bhargava et al. |
| 11,360,867 B1 | 6/2022 | Subramanian et al. |
| 11,409,622 B1 | 8/2022 | Kaushik et al. |
| 11,481,139 B1 | 10/2022 | Mjayan et al. |
| 11,550,679 B2 | 1/2023 | Kaushik et al. |
| 2002/0132613 A1 | 9/2002 | Leung et al. |
| 2004/0153719 A1 | 8/2004 | Achiwa et al. |
| 2005/0229034 A1 | 10/2005 | Fujibayashi |
| 2006/0236048 A1 | 10/2006 | Deguchi et al. |
| 2007/0180307 A1 | 8/2007 | Zohar et al. |
| 2007/0234006 A1 | 10/2007 | Radulescu et al. |
| 2008/0201702 A1 | 8/2008 | Bunn |
| 2009/0043979 A1 | 2/2009 | Jarvis |
| 2009/0089609 A1 | 4/2009 | Baba |
| 2009/0307530 A1 | 12/2009 | Tarta |
| 2010/0064168 A1 | 3/2010 | Smoot et al. |
| 2010/0082962 A1 | 4/2010 | Srinivasan et al. |
| 2010/0161554 A1 | 6/2010 | Datuashvili et al. |
| 2011/0106855 A1 | 5/2011 | Resch et al. |
| 2011/0314148 A1 | 12/2011 | Petersen et al. |
| 2012/0151249 A1 | 6/2012 | Swan et al. |
| 2014/0298136 A1 | 10/2014 | Resch et al. |
| 2015/0006949 A1 | 1/2015 | Bittles et al. |
| 2015/0058838 A1 | 2/2015 | Tsirkin |
| 2015/0378767 A1* | 12/2015 | Tarasuk-Levin ...... G06F 9/4856 718/1 |
| 2016/0063083 A1* | 3/2016 | Mu ..................... H04L 67/1095 709/227 |
| 2016/0366226 A1 | 12/2016 | Friedman et al. |
| 2017/0093983 A1 | 3/2017 | Everhart et al. |
| 2018/0260125 A1 | 9/2018 | Botes et al. |
| 2018/0352032 A1 | 12/2018 | Liu et al. |
| 2019/0004908 A1 | 1/2019 | Gopinath et al. |
| 2019/0034286 A1 | 1/2019 | Brown et al. |
| 2019/0229978 A1 | 7/2019 | Rajvaidya et al. |
| 2019/0347352 A1 | 11/2019 | Gochkov et al. |
| 2019/0394266 A1 | 12/2019 | Fukuyama et al. |
| 2020/0034258 A1 | 1/2020 | Avraham et al. |
| 2020/0050495 A1 | 2/2020 | Voutilainen et al. |
| 2020/0050587 A1 | 2/2020 | Kaushik et al. |
| 2020/0125460 A1 | 4/2020 | Selvaraj et al. |
| 2020/0133520 A1 | 4/2020 | Patnaik et al. |
| 2020/0273984 A1 | 8/2020 | Nakano et al. |
| 2020/0278984 A1 | 9/2020 | Kaushik et al. |
| 2020/0319982 A1 | 10/2020 | Rusev et al. |
| 2021/0303165 A1 | 9/2021 | Kaushik et al. |
| 2021/0374157 A1 | 12/2021 | Reddy et al. |
| 2022/0019350 A1 | 1/2022 | Karr |
| 2022/0121533 A1 | 4/2022 | Kumar et al. |
| 2022/0317896 A1 | 10/2022 | Valan et al. |
| 2022/0317897 A1 | 10/2022 | Subramanian et al. |
| 2022/0318104 A1 | 10/2022 | Bhargava et al. |
| 2022/0318105 A1 | 10/2022 | Subramanian et al. |
| 2022/0374321 A1 | 11/2022 | Kaushik et al. |
| 2023/0119175 A1 | 4/2023 | Kaushik et al. |

OTHER PUBLICATIONS

Co-pending U.S. Appl. No. 17/970,961, inventor Vijayan; Anoop, filed Oct. 21, 2022.

Non-Final Office Action dated Jan. 17, 2023 for U.S. Appl. No. 17/881,381, filed Aug. 4, 2022, 18 pages.

Non-Final Office Action dated Mar. 16, 2023 for U.S. Appl. No. 17/970,961, filed Oct. 21, 2022, 6 pages.

Notice of Allowance dated Dec. 13, 2022 for U.S. Appl. No. 17/219,815, filed Mar. 31, 2021.

Notice of Allowance dated Nov. 18, 2022 for U.S. Appl. No. 17/219,812, filed Mar. 31, 2021, 12 pages.

Notice of Allowance dated Oct. 31, 2022 for U.S. Appl. No. 17/219,812, filed Mar. 31, 2021, 9 pages.

Notice of Allowance dated Apr. 7, 2023 for U.S. Appl. No. 17/219,740, filed Mar. 31, 2021, 7 pages.

Notice of Allowance dated Mar. 3, 2023 for U.S. Appl. No. 17/219,815, filed Mar. 31, 2021, 5 pages.

Notice of Allowance dated Mar. 20, 2023 for U.S. Appl. No. 17/219,740, filed Mar. 31, 2021, 11 pages.

Pan L, "Paxos at Its Heart is Very Simple", Distributed System, 2018, Retrieved From : URL: https://blog.the-pans.com/paxos-explained/, pp. 1-12.

U.S. Non-Final Office action dated Dec. 21, 2021 in U.S. Appl. No. 17/238,829, filed Apr. 23, 2021, 20 pages.

U.S. Notice of Allowance dated Apr. 6, 2022 in U.S. Appl. No. 17/238,829, filed Apr. 23, 2021, 9 pages.

U.S. Notice of Allowance dated Jun. 24, 2022 in U.S. Appl. No. 17/219,816, filed Mar. 31, 2021, 8 pages.

U.S. Notice of Allowance dated May 6, 2022 in U.S. Appl. No. 17/219,746, filed Mar. 31, 2021, 18 pages.

U.S. Notice of Allowance dated Oct. 26, 2022 in U.S. Appl. No. 17/219,812, filed Mar. 31, 2021, 9 pages.

* cited by examiner

RESEEDING A MEDIATOR OF A CROSS-SITE STORAGE SOLUTION

RELATED APPLICATIONS

This application is a continuation of U.S. patent application Ser. No. 17/219,740, filed Mar. 31, 2021, which is hereby incorporated by reference in its entirety for all purposes.

BACKGROUND

Field

Various embodiments of the present disclosure generally relate to multi-site distributed data storage systems. In particular, some embodiments relate to bringing a mediator associated with a cross-site storage solution (e.g., a cross-site high-availability (HA) storage solution or a cross-site asynchronous disaster recovery (DR) solution) back into the role of an arbitrator after the mediator has become available after a period of unavailability to support resumption of failover operations on behalf of the cross-site storage solution.

Description of the Related Art

Multiple storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume.

Business enterprises rely on multiple clusters for storing and retrieving data. Each cluster may reside within a separate data center with the clusters communicating with mediators over an unreliable network. The network can be prone to failures leading to connectivity issues such as transient or persistent connectivity issues that may disrupt operations of a business enterprise.

SUMMARY

Systems and methods are described for making a cross-site storage solution resilient towards mediator unavailability. According to one embodiment, unavailability of a mediator associated with a consistency group of a distributed storage system is determined. Further, the occurrence of a change in a data replication status of the consistency group during unavailability of the mediator is determined. The changed data replication status is added to a list of changes to be updated when the mediator becomes available. The mediator is precluded from acting as an arbitrator for a failover operation associated with the consistency group until the mediator has been informed of the changed data replication status.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
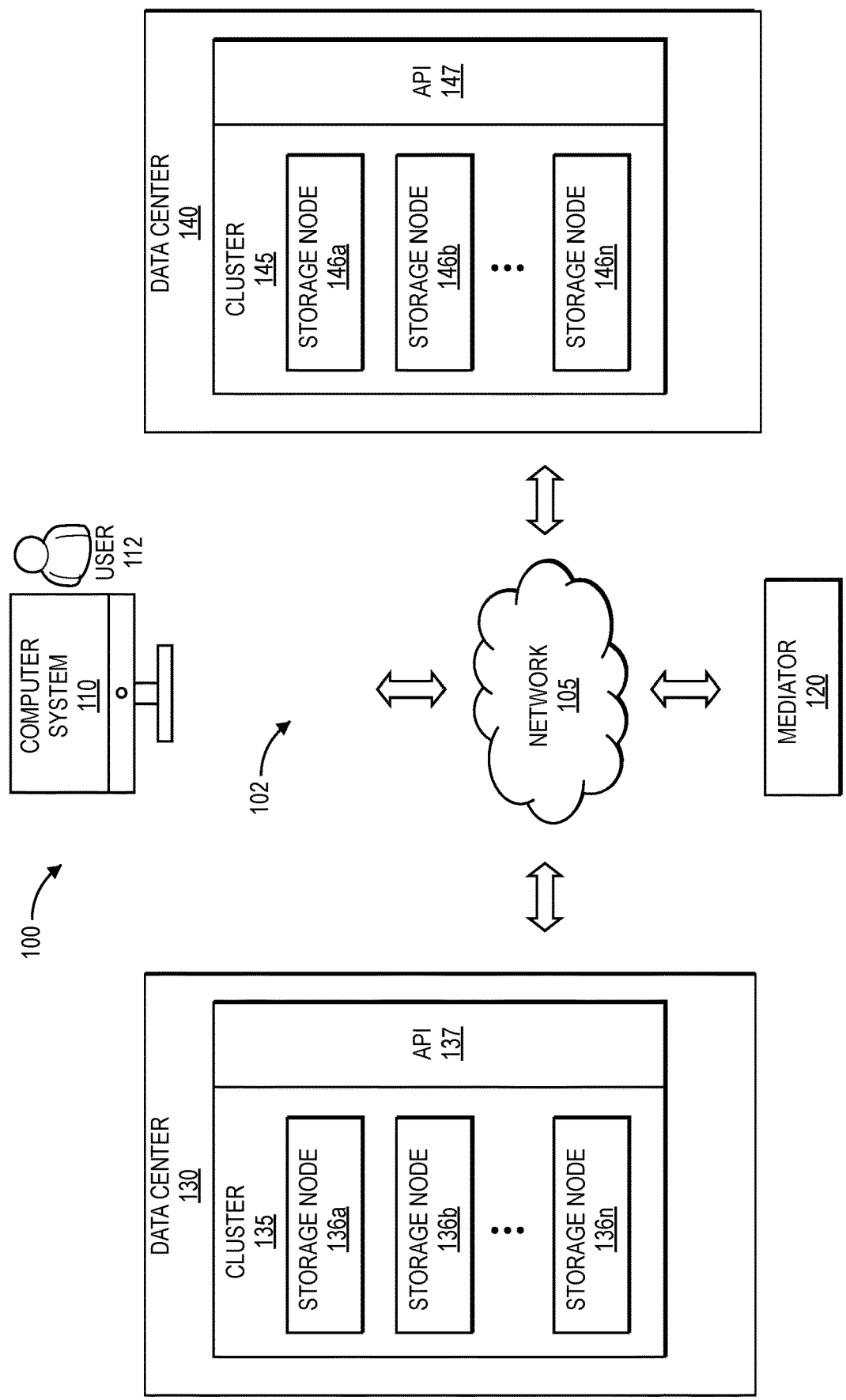
FIG. 1 is a block diagram illustrating an environment in which various embodiments may be implemented.

Systems and methods are described for making a cross-site storage solution resilient towards mediator unavailability. As described further below, in the context of a cross-site HA storage solution (a/k/a stretched storage) that provides transparent application failover across multiple sites (e.g., two sites), a pair of peered distributed storage systems, including a primary distributed storage system and a secondary distributed storage system, may make use of an external mediator. The external mediator may be provisioned in a site separate from the peered distributed storage systems and configured on the peered distributed storage systems to act as an arbitrator towards handling of split brain scenarios and other failure cases, including site failures.

As explained in further detail below, in the context of a cross-site HA storage solution, various operations (e.g., data replication, data migration, data protection, failover, mediator reseeding, and the like) may be performed at the level of granularity of a consistency group (CG), which facilitates the grouping together of a set of data containers/volumes on the peered distributed storage systems. For example, a dataset associated with one or more volumes that are members of a local CG of a primary distributed storage system may be synchronously replicated to a mirror copy associated with a remote CG of the secondary distributed storage system. In this manner, responsive to a failover, an application that is reliant upon the member volumes of the protected CG can seamlessly access the minor copy on the secondary distributed storage system and continue its services.

In some embodiments, the mediator provides a persistent store for various CG relationship information that may be used for Planned Failover (PFO) and Automatic Unplanned Failover (AUFO). Relationship state information (e.g., data replication status) may also be persisted within the primary and secondary distributed storage systems on behalf of each of the peered CGs. Notably, the mediator cannot be trusted to act as an arbitrator on behalf of the peered CGs for performing failover when the CG relationship information is inconsistent among any of the peer distributed storage systems and the mediator. Inconsistencies may arise when the mediator is unavailable to one or both of the peered distributed storage systems, for example, due to network connectivity issues or a server hosting the mediator going down. Periods of time during which the mediator is unavailable may be short lived (e.g., transient network communication issues) or may last longer (e.g., mediator maintenance activities) depending on the failure or the particular scenario involved. During such periods of mediator unavailability and/or when relationship state information (e.g., data replication status) on the mediator has become stale, the mediator cannot be trusted to operate in its role as an arbitrator for performing failover. As such, it is desirable for the cross-site HA storage solution to be resilient to mediator unavailability by, among other things, detecting when the mediator become available after a period of unavailability and performing appropriate operations to update the mediator's state so as to bring the mediator back into the role of an arbitrator, so failover operations are allowed. The latter operators may be referred to herein as reseeding the mediator. Because the cross-site HA distributed storage system spans multiple sites, the mediator reseed process is a distributed problem and care should be taken to preclude multiple simultaneous processes from trying to run the mediator reseed process for a given CG. According to one embodiment, upon detecting that the mediator is unavailable at either cluster, a 'reseed status indicator' may be set in a coordinated way for both a local CG and a remote CG so as to disable any failover operations from the local CG to the remote CG or vice versa.

Embodiments described herein seek to improve various technological processes associated with cross-site storage solutions and ensure the process of reinstating a mediator to the role of an arbitrator does not cause correctness issues. Various embodiments of the present technology provide for a wide range of technical effects, advantages, and/or improvements to stretched storage systems and participating distributed storage systems. For example, various embodiments may include one or more of the following technical effects, advantages, and/or improvements: (i) facilitating configuration or replacement of a mediator for a pair of peered CGs after CG relationship information has been configured, initialized, and operational; (ii) monitoring of CG relationship information changes during mediator unavailability; (iii) automating detection of a mediator becoming available after a failure has been rectified; (iv) handling of scenarios in which a mediator is brought down for maintenance (e.g., operating system upgrade or hardware upgrade) or a hardware refresh of a server hosting the mediator; and/or (v) use of non-routine and unconventional operations to perform a mediator reseed process.

According to various embodiments described herein, a distributed storage system of a cross-site storage solution is operable to perform a mediator reseed process to bring a mediator configured for a peered pair of CGs, including a local CG associated with the distributed storage system and a remote CG associated with a remote distributed storage system, back into the role of an arbitrator by updating stale CG relationship information for the local CG on the mediator responsive to the mediator becoming available after a period of unavailability. A mediator reseed status indicator is maintained by the distributed storage system for each of multiple CGs associated with the distributed storage system to identify when relationship status information stored on the mediator for a given CG is stale. Responsive to a predetermined event (e.g., automated or manual triggering of the reseed process), the local CG is identified as the subject of a mediator reseed process based on a corresponding mediator reseed status indicator. A determination is then made regarding whether the distributed storage system hosts a master copy of a dataset for the local CG and the given node represents a master node. If so, the mediator reseed process is performed by the master node, including: (i) causing relationship status information for the local CG to be updated on the mediator to reflect the current state of the relationship status information maintained by the distributed storage system; and (ii) updating the mediator reseed status indicator for the local CG.

While some embodiments of the present disclosure are described herein with reference to particular usage scenarios in the context of cross-site HA storage solutions, it is to be noted that various embodiments of the present disclosure are applicable to various use cases that arise in the context of cross-cite storage solutions more generally, including cross-site asynchronous DR solutions.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Operating Environment

FIG. 1 is a block diagram illustrating an environment 100 in which various embodiments may be implemented. In various examples described herein, an administrator (e.g., user 112) of a multi-site distributed storage system 102 having clusters 135 and cluster 145 or a managed service provider responsible for multiple distributed storage systems of the same or multiple customers may monitor various operations and network conditions of the distributed storage system or multiple distributed storage systems via a browser-based interface presented on computer system 110.

In the context of the present example, the multi-site distributed storage system 102 includes a data center 130, a data center 140, and optionally a mediator 120. The data centers 130 and 140, the mediator 120, and the computer system 110 are coupled in communication via a network 105, which, depending upon the particular implementation, may be a Local Area Network (LAN), a Wide Area Network (WAN), or the Internet.

The data centers 130 and 140 may represent an enterprise data center (e.g., an on-premises customer data center) that is owned and operated by a company or the data center 130 may be managed by a third party (or a managed service provider) on behalf of the company, which may lease the equipment and infrastructure. Alternatively, the data centers 130 and 140 may represent a colocation data center in which a company rents space of a facility owned by others and located off the company premises. The data centers are shown with a cluster (e.g., cluster 135, cluster 145). Those of ordinary skill in the art will appreciate additional IT infrastructure may be included within the data centers 130 and 140. In one example, the data center 140 is a mirrored copy of the data center 130 to provide non-disruptive operations at all times even in the presence of failures including, but not limited to, network disconnection between the data centers 130 and 140 and the mediator 120, which can also be located at a data center.

Turning now to the cluster 135, it includes multiple storage nodes 136a-n and an Application Programming Interface (API) 137. In the context of the present example, the multiple storage nodes 136a-n are organized as a cluster and provide a distributed storage architecture to service storage requests issued by one or more clients (not shown) of the cluster. The data served by the storage nodes 136a-n may be distributed across multiple storage units embodied as persistent storage devices, including but not limited to HDDs, SSDs, flash memory systems, or other storage devices. In a similar manner, cluster 145 includes multiple storage nodes 146a-n and an Application Programming Interface (API) 147. In the context of the present example, the multiple storage nodes 146a-n are organized as a cluster and provide a distributed storage architecture to service storage requests issued by one or more clients of the cluster.

The API 137 may provide an interface through which the cluster 135 is configured and/or queried by external actors (e.g., the computer system 110, data center 140, the mediator 120, clients). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration, storage efficiency metrics, and other system data) relating to the cluster 135 or components thereof. As those skilled in the art will appreciate various other types of telemetry data may be made available via the API 137, including, but not limited to measures of latency, utilization, and/or performance at various levels (e.g., the cluster level, the storage node level, or the storage node component level).

In the context of the present example, the mediator 120, which may represent a private or public cloud accessible (e.g., via a web portal) to an administrator associated with a managed service provider and/or administrators of one or more customers of the managed service provider, includes a cloud-based, monitoring system.

While for sake of brevity, only two data centers are shown in the context of the present example, it is to be appreciated that additional clusters owned by or leased by the same or different companies (data storage subscribers/customers) may be monitored and one or more metrics may be estimated based on data stored within a given level of a data store in accordance with the methodologies described herein and such clusters may reside in multiple data centers of different types (e.g., enterprise data centers, managed services data centers, or colocation data centers).

Figure 2:
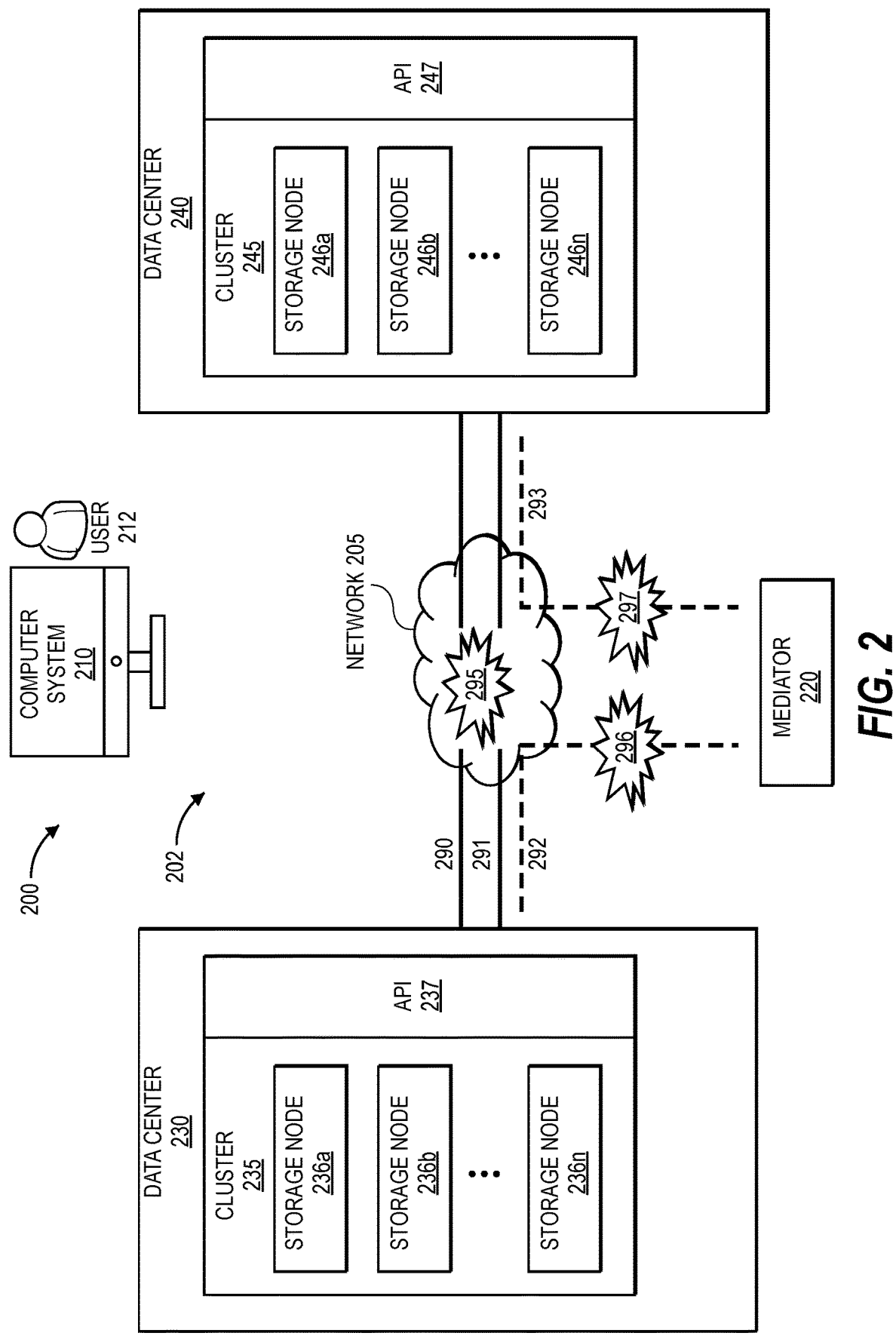
FIG. 2 is a block diagram illustrating an environment having potential failures within a multi-site distributed storage system in which various embodiments may be implemented.

FIG. 2 is a block diagram illustrating an environment 200 having potential failures within a multi-site distributed storage system 202 in which various embodiments may be implemented. In various examples described herein, an administrator (e.g., user 212) of a multi-site distributed storage system 202 having clusters 235 and cluster 245 or a managed service provider responsible for multiple distributed storage systems of the same or multiple customers may monitor various operations and network conditions of the distributed storage system or multiple distributed storage systems via a browser-based interface presented on computer system 210.

In the context of the present example, the system 202 includes data center 230, data center 240, and optionally a mediator 220. The data centers 230 and 240, the mediator 220, and the computer system 210 are coupled in communication via a network 205, which, depending upon the particular implementation, may be a Local Area Network (LAN), a Wide Area Network (WAN), or the Internet.

The data centers 230 and 240 may represent an enterprise data center (e.g., an on-premises customer data center) that is owned and operated by a company or the data center 230 may be managed by a third party (or a managed service provider) on behalf of the company, which may lease the equipment and infrastructure. Alternatively, the data centers 230 and 240 may represent a colocation data center in which a company rents space of a facility owned by others and located off the company premises. The data centers are shown with a cluster (e.g., cluster 235, cluster 245). Those of ordinary skill in the art will appreciate additional IT infrastructure may be included within the data centers 230 and 240. In one example, the data center 240 is a mirrored copy of the data center 230 to provide non-disruptive operations at all times even in the presence of failures including, but not limited to, network disconnection between the data centers 230 and 240 and the mediator 220, which can also be a data center.

The system 202 can utilize communications 290 and 291 to synchronize a mirrored copy of data of the data center 240 with a primary copy of the data of the data center 230. Either of the communications 290 and 291 between the data centers 230 and 240 may have a failure 295. In a similar manner, a communication 292 between data center 230 and mediator 220 may have a failure 296 while a communication 293 between the data center 240 and the mediator 220 may have a failure 297. If not responded to appropriately, these failures whether transient or permanent have the potential to disrupt operations for users of the distributed storage system 202. In one example, communications between the data centers 230 and 240 have approximately a 5-20 millisecond round trip time.

Turning now to the cluster 235, it includes at least two storage nodes 236a-b, optionally includes additional storage nodes (e.g., 236n) and an Application Programming Interface (API) 237. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

Turning now to the cluster 245, it includes at least two storage nodes 246a-b, optionally includes additional storage nodes (e.g., 246n) and includes an Application Programming Interface (API) 247. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

In one example, each cluster can have up to 5 CGs with each CG having up to 12 volumes. The system 202 provides a planned failover feature at a CG granularity. The planned failover feature allows switching storage access from a primary copy of the data center 230 to a mirror copy of the data center 240 or vice versa.

Figure 3:
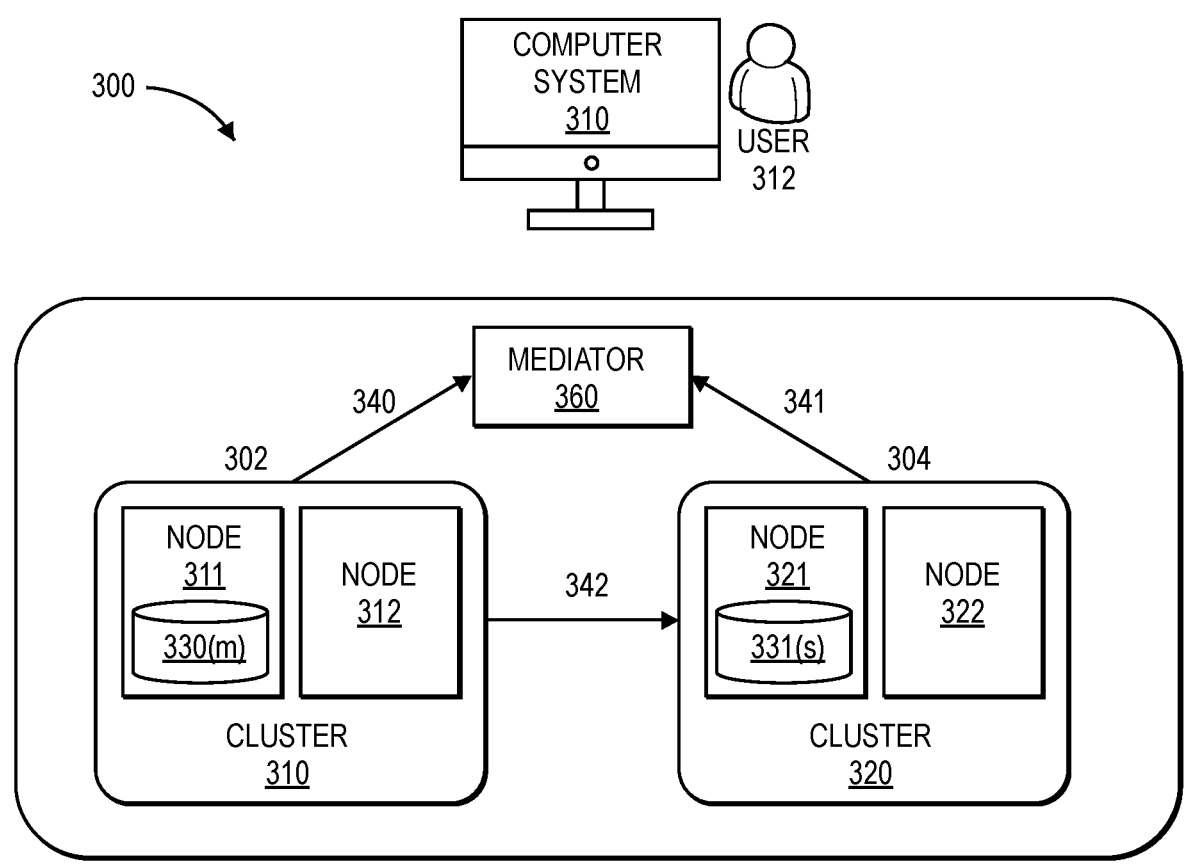
FIG. 3 is a block diagram of a multi-site distributed storage system according to various embodiments of the present disclosure.

FIG. 3 is a block diagram illustrating a multi-site distributed storage system 300 in which various embodiments may be implemented. In various examples described herein, an administrator (e.g., user 312) of the multi-site distributed storage system 302 or a managed service provider responsible for multiple distributed storage systems of the same or multiple customers may monitor various operations and network conditions of the distributed storage system or multiple distributed storage systems via a browser-based interface presented on computer system 310. In the context of the present example, the distributed storage system 300 includes a data center 302 having a cluster 310, a data center 304 having a cluster 320, and a mediator 360. The clusters 310, 320, and the mediator 360 are coupled in communication (e.g., communications 340-342) via a network, which, depending upon the particular implementation, may be a Local Area Network (LAN), a Wide Area Network (WAN), or the Internet.

The cluster 310 includes nodes 311 and 312 while the cluster 320 includes nodes 321 and 322. In one example, the cluster 320 has a data copy 331 that is a mirrored copy of the data copy 330 to provide non-disruptive operations at all times even in the presence of failures including, but not limited to, network disconnection between the data centers 302 and 304 and the mediator 360.

The multi-site distributed storage system 300 provides correctness of data, availability, and redundancy of data. In one example, the node 311 is designated as a master and the node 321 is designated as a slave. The master is given preference to serve I/O commands to requesting clients and this allows the master to obtain a consensus in a case of a race between the clusters 310 and 320. The mediator 360 enables an automated unplanned failover (AUFO) in the event of a failure. The data copy 330 (master), data copy 331 (slave), and the mediator 360 form a three way quorum. If two of the three entities reach an agreement for whether the master or slave should serve I/O commands to requesting clients, then this forms a strong consensus.

The master and slave roles for the clusters 310 and 320 help to avoid a split-brain situation with both of the clusters simultaneously attempting to serve I/O commands. There are scenarios where both master and slave copies can claim to be a master copy. For example, a recovery post failover or failure during planned failover workflow can results in both clusters 310 and 320 attempting to serve I/O commands. In one example, a slave cannot serve I/O until an AUFO happens. A master doesn't serve I/O commands until the master obtains a consensus.

The multi-site distributed storage system 300 presents a single virtual logical unit number (LUN) to a host computer or client using a synchronized-replicated distributed copies of a LUN. A LUN is a unique identifier for designating an individual or collection of physical or virtual storage devices that execute input/output (I/O) commands with a host computer, as defined by the Small System Computer Interface (SCSI) standard. In one example, active or passive access to this virtual LUN causes read and write commands to be serviced only by node 311 (master) while operations received by the node 321 (slave) are proxied to node 311.

Example Storage Node

Figure 4:
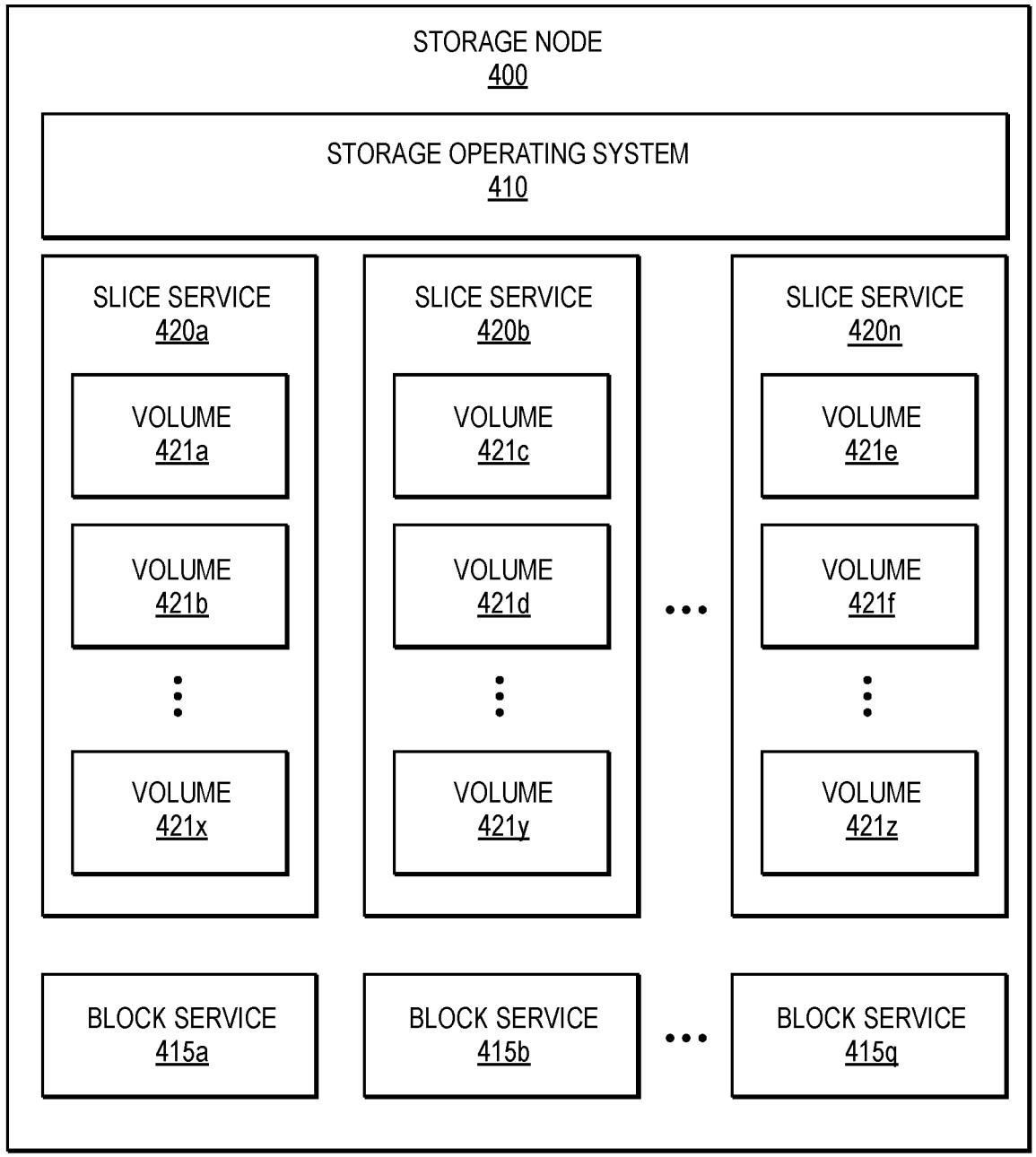
FIG. 4 is a block diagram illustrating a storage node in accordance with an embodiment of the present disclosure.

FIG. 4 is a block diagram illustrating a storage node 400 in accordance with an embodiment of the present disclosure. Storage node 400 represents a non-limiting example of storage nodes (e.g., 136a-n, 146a-n, 236a-n, 246a-n, 311, 312, 331, 322, 712, 714, 752, 754) described herein. In the context of the present example, storage node 400 includes a storage operating system 410, one or more slice services 420a-n, and one or more block services 415a-q. The storage operating system (OS) 410 may provide access to data stored by the storage node 400 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 410 is NetApp Element Software (e.g., the SolidFire Element OS) based on Linux and designed for SSDs and scale-out architecture with the ability to expand up to 100 storage nodes.

Each slice service 420 may include one or more volumes (e.g., volumes 421a-x, volumes 421c-y, and volumes 421e-z). Client systems (not shown) associated with an enterprise may store data to one or more volumes, retrieve data from one or more volumes, and/or modify data stored on one or more volumes.

The slice services 420a-n and/or the client system may break data into data blocks. Block services 415a-q and slice services 420a-n may maintain mappings between an address of the client system and the eventual physical location of the data block in respective storage media of the storage node 400. In one embodiment, volumes 421 include unique and uniformly random identifiers to facilitate even distribution of a volume's data throughout a cluster (e.g., cluster 135). The slice services 420a-n may store metadata that maps between client systems and block services 415. For example, slice services 420 may map between the client addressing used by the client systems (e.g., file names, object names, block numbers, etc. such as Logical Block Addresses (LBAs)) and block layer addressing (e.g., block IDs) used in block services 415. Further, block services 415 may map between the block layer addressing (e.g., block identifiers) and the physical location of the data block on one or more storage devices. The blocks may be organized within bins maintained by the block services 415 for storage on physical storage devices (e.g., SSDs).

As noted above, a bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 415a-q and associated storage device (e.g., SSD). A sublist identifier may identify a sublist with the bin, which may be used to facilitate network transfer (or syncing) of data among block services in the event of a failure or crash of the storage node 400. Accordingly, a client can access data using a client address, which is eventually translated into the corresponding unique identifiers that reference the client's data at the storage node 400.

For each volume 421 hosted by a slice service 420, a list of block IDs may be stored with one block ID for each logical block on the volume. Each volume may be replicated between one or more slice services 420 and/or storage nodes 400, and the slice services for each volume may be synchronized between each of the slice services hosting that volume. Accordingly, failover protection may be provided in case a slice service 420 fails, such that access to each volume may continue during the failure condition.

Consistency Groups

Figure 5:
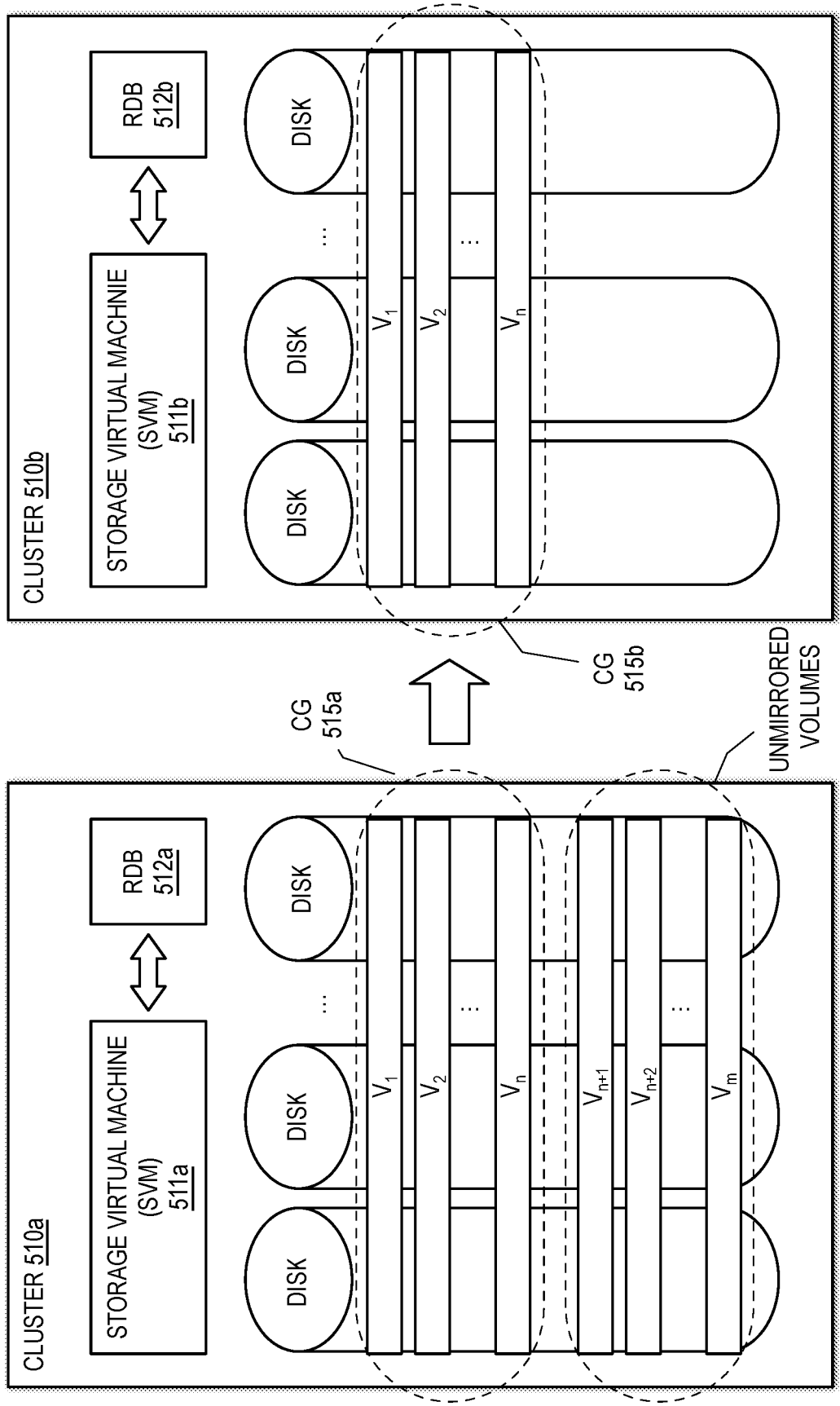
FIG. 5 is a block diagram illustrating the concept of a consistency group (CG) in accordance with an embodiment of the present disclosure.

FIG. 5 is a block diagram illustrating the concept of a consistency group (CG) in accordance with an embodiment of the present disclosure. In the context of the present example, a stretch cluster including two clusters (e.g., cluster 110a and 110b) is shown. The clusters may be part of a cross-site high-availability (HA) solution that supports zero recovery point objective (RPO) and zero recovery time objective (RTO) protections by, among other things, providing a mirror copy of a dataset at a remote location, which is typically in a different fault domain than the location at which the dataset is hosted. For example, cluster 110a may be operable within a first site (e.g., a local data center) and cluster 110b may be operable within a second site (e.g., a remote data center) so as to provide non-disruptive operations even if, for example, an entire data center becomes non-functional, by seamlessly failing over the storage access to the mirror copy hosted in the other data center.

According to some embodiments, various operations (e.g., data replication, data migration, data protection, failover, and the like) may be performed at the level of granularity of a CG (e.g., CG 115a or CG 115b). A CG is a collection of storage objects or data containers (e.g., volumes) within a cluster that are managed by a Storage Virtual Machine (e.g., SVM 111a or SVM 111b) as a single unit. In various embodiments, the use of a CG as a unit of data replication guarantees a dependent write-order consistent view of the dataset and the mirror copy to support zero RPO and zero RTO. CGs may also be configured for use in connection with taking simultaneous snapshot images of multiple volumes, for example, to provide crash-consistent copies of a dataset associated with the volumes at a particular point in time. The level of granularity of operations supported by a CG is useful for various types of applications. As a non-limiting example, consider an application, such as a database application, that makes use of multiple volumes, including maintaining logs on one volume and the database on another volume.

The volumes of a CG may span multiple disks (e.g., electromechanical disks and/or SSDs) of one or more storage nodes of the cluster. A CG may include a subset or all volumes of one or more storage nodes. In one example, a CG includes a subset of volumes of a first storage node and a subset of volumes of a second storage node. In another example, a CG includes a subset of volumes of a first storage node, a subset of volumes of a second storage node, and a subset of volumes of a third storage node. A CG may be referred to as a local CG or a remote CG depending upon the perspective of a particular cluster. For example, CG 115a may be referred to as a local CG from the perspective of cluster 110a and as a remote CG from the perspective of cluster 110b. Similarly, CG 115a may be referred to as a remote CG from the perspective of cluster 110b and as a local CG from the perspective of cluster 110b. At times, the volumes of a CG may be collectively referred to herein as members of the CG and may be individually referred to as a member of the CG. In one embodiment, members may be added or removed from a CG after it has been created.

A cluster may include one or more SVMs, each of which may contain data volumes and one or more logical interfaces (LIFs) (not shown) through which they serve data to clients. SVMs may be used to securely isolate the shared virtualized data storage of the storage nodes in the cluster, for example, to create isolated partitions within the cluster. In one embodiment, an LIF includes an Internet Protocol (IP) address and its associated characteristics. Each SVM may have a separate administrator authentication domain and can be managed independently via a management LIF to allow, among other things, definition and configuration of the associated CGs.

In the context of the present example, the SVMs make use of a configuration database (e.g., replicated database (RDB) 112a and 112b), which may store configuration information for their respective clusters. A configuration database provides cluster wide storage for storage nodes within a cluster. The configuration information may include relationship information specifying the status, direction of data replication, relationships, and/or roles of individual CGs, a set of CGs, members of the CGs, and/or the mediator. A pair of CGs may be said to be "peered" when one is protecting the other. For example, a CG (e.g., CG 115b) to which data is configured to be synchronously replicated may be referred to as being in the role of a destination CG, whereas the CG (e.g., CG 115a) being protected by the destination CG may be referred to as the source CG. Various events (e.g., transient or persistent network connectivity issues, availability/unavailability of the mediator, site failure, and the like) impacting the stretch cluster may result in the relationship information being updated at the cluster and/or the CG level to reflect changed status, relationships, and/or roles.

While in the context of various embodiments described herein, a volume of a CG may be described as performing certain actions (e.g., taking other members of a CG out of synchronization, disallowing/allowing access to the dataset or the mirror copy, issuing consensus protocol requests, etc.), it is to be understood such references are shorthand for an SVM or other controlling entity, managing or containing the volume at issue, performing such actions on behalf of the volume.

While in the context of various examples described herein, data replication may be described as being performed in a synchronous manner between a paired set of CGs associated with different clusters (e.g., from a primary or master cluster to a secondary or slave cluster), data replication may also be performed asynchronously and/or within the same cluster. Similarly, a single remote CG may protect multiple local CGs and/or multiple remote CGs may protect a single local CG. In addition, those skilled in the art will appreciate a cross-site high-availability (HA) solution may include more than two clusters, in which a mirrored copy of a dataset of a primary (master) cluster is stored on more than one secondary (slave) cluster.

The various nodes (e.g., storage nodes 136a-n and storage node 200) of the distributed storage systems described herein, and the processing described below with reference to the flow diagrams of FIGS. 6-11 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 12 below.

Periodic Health Check

Figure 6:
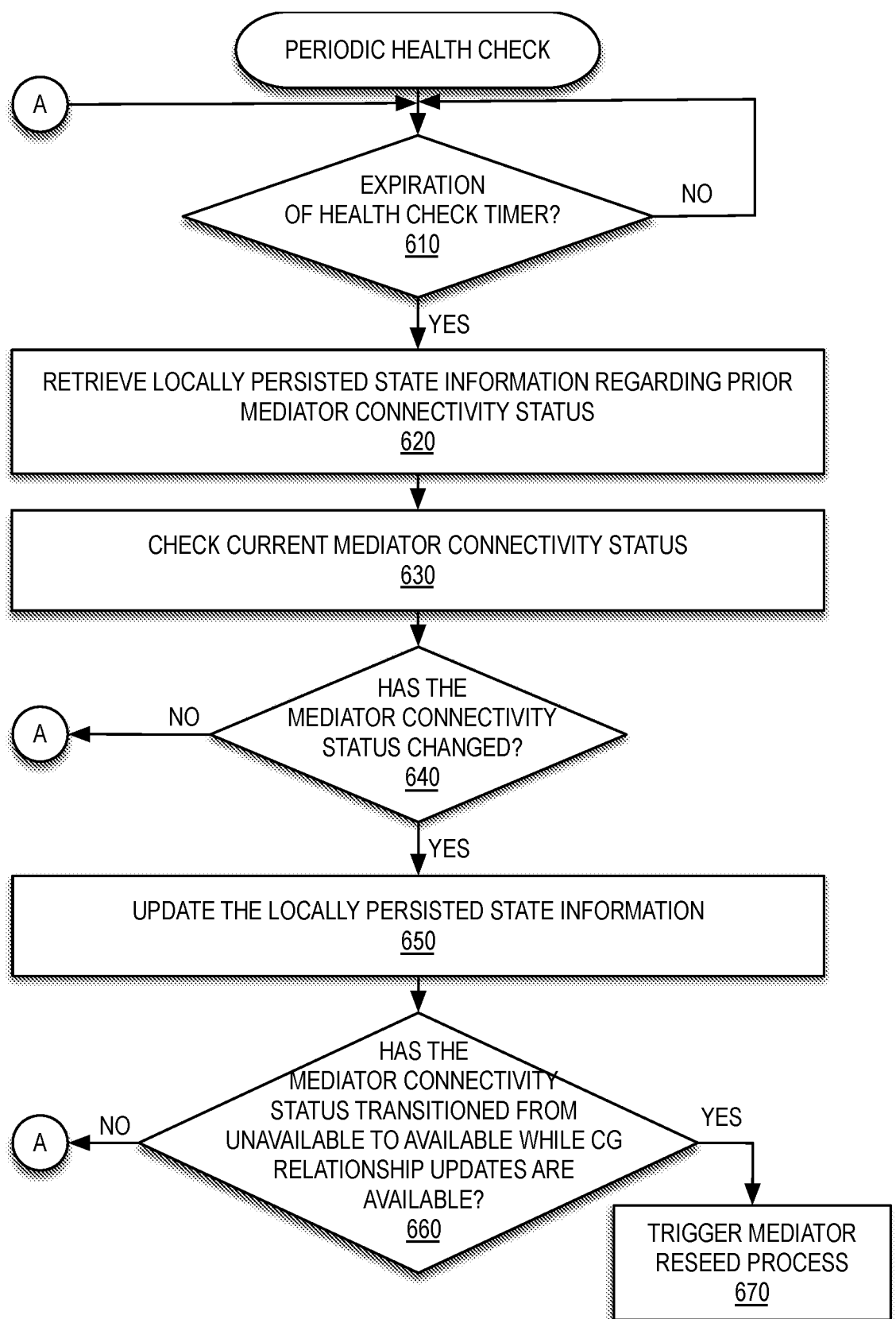
FIG. 6 is a flow diagram illustrating periodic health check processing in accordance with an embodiment of the present disclosure.

FIG. 6 is a flow diagram illustrating periodic health check processing in accordance with an embodiment of the present disclosure. According to one embodiment, periodic health check processing is performed on each node (e.g., storage node 236a-n and storage node 246a-n) of a cross-site HA storage solution and results of the periodic health check are tracked individually for each CG (e.g., CG 515a). The periodic health check allows the respective distributed storage systems (e.g., cluster 235 and cluster 245) to determine a connectivity status (e.g., available or unavailable) of a mediator (e.g., mediator 222) associated with the cross-site HA storage solution and when the mediator has transitioned from available to unavailable and vice versa. As noted above, the mediator may be unavailable for various reasons (e.g., due to network connectivity issues, failure of a server hosting the mediator, or maintenance of the mediator) to either one of the local or remote distributed storage systems or both.

In some embodiments, mediator unavailability is not alone sufficient for undergoing a mediator reseed process for a particular CG. Mediator reseed should be performed for a CG when the CG undergoes a state change while the mediator was unavailable. For example, mediator reseed should be performed when CG relationship status information changes (e.g., the status of data replication for a CG goes from in synchronization (InSync) to out of synchronization (OOS)) and the master distributed storage system allows input/output (I/O) operations to be performed locally based on inter-cluster consensus due to mediator unavailability. Also, mediator reseed should be performed for a CG when the status of data replication for the CG transitions back to Insync from OOS, for example, as a result of an auto-resync process and the mediator is unavailable. In one embodiment, a separate LIF may be provided for each volume. The data replication status for a given volume of a peered pair of volumes may be said to be OOS when its peer volume is unreachable (unavailable). As the unit of data replication is a CG in accordance with various embodiments, the data replication status for a given CG may be said to be OOS when the data replication status for any member volume is OOS. Similarly, the data replication status for a given CG may be considered InSync, only when the data replication status for all member volumes is InSync.

At decision block 610, it is determined whether it is time to perform a health check by the node at issue. If so, processing continues with block 620; otherwise, processing loops back to decision block 610. According to one embodiment, a health check timer may be set and upon expiration of the health check timer, a periodic health check is performed.

At block 620, locally persisted state information regarding a prior mediator connectivity status is retrieved. According to one embodiment, the state information (e.g., available or unavailable) is persisted at a CG level on a cluster-wide basis within a configuration database (e.g., RDB 512a or RDB 512b).

At block 630, the current mediator connectivity status is checked. According to one embodiment, node has a thread (one per mediator) that stays connected to the mediator using a REST API. When the connection to the mediator is lost, the thread keeps retrying until the connection to the mediator is reestablished. The status of the mediator connection may be identified as "available" so long as at least one of the nodes of a particular cluster is connected to the mediator. This connection status information may be accessible to all nodes in the cluster.

At decision block 640, it is determined whether the mediator status has changed since the last health check. If so, then processing continues with block 650; otherwise processing loops back to decision block 610.

At block 650, because the mediator connectivity status has changed, the locally persisted state information is updated.

At decision block 660, it is determined whether the mediator connectivity status has transitioned form unavailable to available while a CG relationship update is available. If so, then processing continues with block 670; otherwise, processing loops back to decision block 610.

At block 670, because a CG relationship status update is available (meaning, locally maintained CG relationship information has been changed while the mediator was unavailable, CG relationship state information maintained by the mediator is considered to be "stale" (e.g., out-of-date or otherwise inconsistent with that maintained by one or both of the distributed storage systems). As such, a mediator reseed process is triggered. As noted above, mediator unavailability alone may not be sufficient for undergoing a mediator reseed process for a particular CG as the mediator may not have missed a state change by a CG. Mediator reseed should be performed for a CG when the CG has undergone a state change (e.g., from InSync to OOS or from OOS to InSync) while the mediator was unavailable. A non-limiting example of CG relationship tracking that may be performed is described below with reference to FIG. 7.

According to one embodiment, in order to maintain correctness, performance of the mediator reseed processing and other simultaneous operations that may be performed on the CG relationship information are serialized. Serialization may be performed, for example, by queuing the reseed task for performance by a particular module of a particular node, which handles the queued tasks in the order received. A non-limiting example of a mediator reseed process is described below with reference to FIG. 8.

At block 670, a reseed status indicator is set to identify the fact that the mediator CG relationship status information may be stale. As noted above, mediator unavailability alone may not be sufficient for undergoing a mediator reseed process for a particular CG as the mediator may not have missed a state change by a CG. As such, in one embodiment, the mediator reseed status indicator (e.g., a 'mediator-is-pending-update' state flag) may be set for a given CG only after the given CG experiences a state change event during the period of mediator unavailability.

Performance of the periodic health check as described above automates the detection of a mediator becoming available again after the failure is rectified and facilitates performance of appropriate methods to bring the mediator back into the role of an arbitrator, so the mediator can be used in connection with failover operations as needed. Advantageously, in some embodiments, identifying existence of the conditions for performing a mediator reseed process and triggering of the mediator reseed process may be performed without any manual intervention, thereby ensuring that the process of bringing the mediator back to the role of as an arbitrator does not cause any correctness issues. In an alternative embodiment, for example, involving asynchronous data replication from the primary to the secondary distributed storage system or when zero RTO is not warranted, the mediator reseed process may not be automated and may instead be triggered responsive to a request from an administrative user of the cross-site HA storage solution.

While in the context of the present example, a mediator reseed process is described as being triggered when a mediator transitions from a connectivity status of unavailable to a connectivity status of available, the mediator reseed process may also be triggered for affected CGs when a mediator is deleted and a new mediator is added.

Table 1 (below) summarizes the various actions taken by a distributed storage system (e.g., cluster 235 or cluster 245) hosting a master copy of a dataset for a CG responsive to various combinations of the data replication status of the CG, mediator connectivity status, and associated transitions in accordance with an embodiment of the present disclosure.

TABLE 1

Action taken by a Cluster Hosting a Master Copy of a Dataset for a CG Responsive to Various Combinations of CG Replication Status, Mediator Availability States, and Associated Transitions.

| Cluster CG Data Replication Status | Mediator CG Replication Status | Mediator Connectivity Status | Action |
|---|---|---|---|
| InSync | InSync | Available | N/A |
| InSync | InSync | Transition from Available to Unavailable | N/A |
| InSync | InSync | Unavailable | N/A |
| Transition from InSync to OOS | InSync | Unavailable | Flag need for Mediator Reseed |
| OOS | InSync | Transition from Unavailable to Available | Mediator Reseed Triggered |
| OOS | OOS | Available | N/A |
| OOS | OOS | Transition from Available to Unavailable | N/A |
| OOS | OOS | Unavailable | N/A |
| Transition from OOS to InSync | OOS | Unavailable | Flag need for Mediator Reseed |
| InSync | OOS | Transition from Unavailable to Available | Mediator Reseed Triggered |

CG Relationship Tracking

Figure 7:
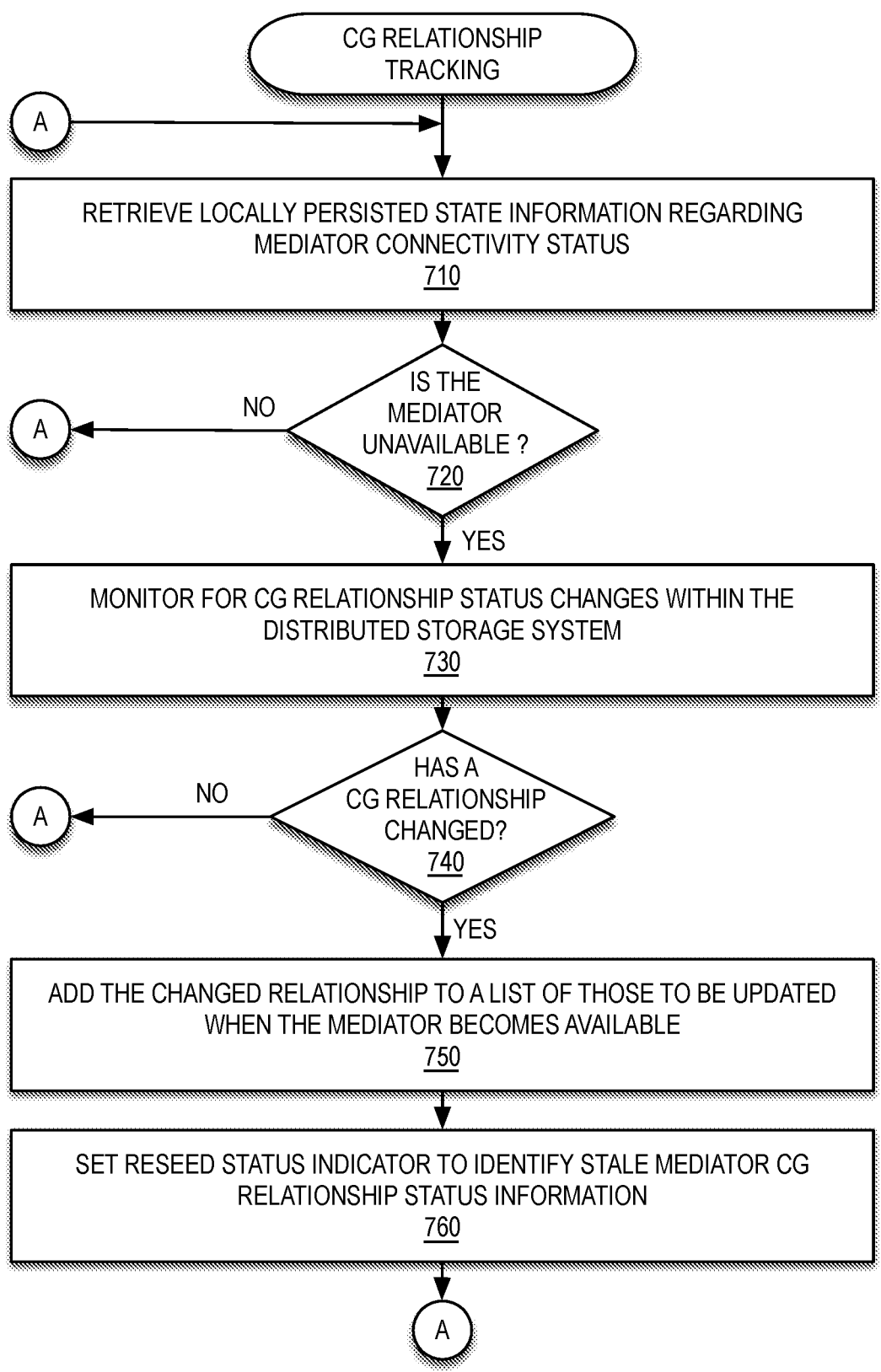
FIG. 7 is a flow diagram illustrating CG relationship tracking in accordance with an embodiment of the present disclosure.

FIG. 7 is a flow diagram illustrating CG relationship tracking in accordance with an embodiment of the present disclosure. In the context of the present example, each distributed storage system (e.g., cluster 235 and cluster 245) participating in the cross-site HA storage solution maintains a list of CG relationships that are to be updated to the mediator (e.g., mediator 220) upon its return to the available state after a period of unavailability. For example, as described below, when a CG relationship is created or modified, a record may be added to this list.

In one embodiment, during mediator unavailability, responsive to a state change event for CG relationship information (e.g., a change in status of data replication) for a given CG, information indicating the mediator is to be updated in the form of a mediator reseed status indicator (e.g., a 'mediator-is-pending-update' state flag) may be persisted in a CG-specific RDB table for the given CG. Each distributed storage system participating in the cross-site HA storage solution may independently track mediator reseed status indicators for its respective CGs. According to one embodiment, while this mediator reseed status indicator identifies a mediator's CG relationship status information is stale for a particular CG, the cross-site HA storage solution should not use the mediator as an arbitrator for failover operations for that CG as the mediator state is not trustworthy and this could lead to data consistency issues.

At block 710, the locally persisted state information (e.g., that is maintained by or on behalf of the cluster at issue) regarding mediator connectivity is retrieved.

At decision block 720, it is determined if the mediator is currently unavailable. If so, processing continues with block 730; otherwise, processing loops back to block 710 (potentially, after a predetermined or configurable delay).

At block 730, monitoring is performed for CG relationship status changes within the distributed storage system. According to one embodiment, a change in the data replication status for a CG from InSync to 00S or vice versa, for example, as a result of a change in mediator connectivity status detected as part of a periodic health check, may be tracked.

At decision block 740, it is determined whether a CG relationship has changed (during mediator unavailability). If so, processing continues with block 750; otherwise, processing loops back to block 710 (again, potentially, after a predetermined or configurable delay).

At block 750, the changed relationship is added to a list of those to be updated when the mediator connectivity status returns to available.

At block 760, a reseed status indicator is set to identify the fact that the mediator CG relationship status information is stale. As noted above, mediator unavailability alone may not be sufficient for undergoing a mediator reseed process for a particular CG as the mediator may not have missed a state change by a CG. As such, in the context of the present example, the mediator reseed status indicator (e.g., a 'mediator-is-pending-update' state flag) is set for a given CG only after the given CG experiences a state change event during the period of mediator unavailability.

While in the context of the present example, setting of the mediator reseed status indicator may be performed independently on a particular distributed storage systems as a result of the periodic health check processing, in some embodiments, the mediator reseed status indicator is also propagated to the peer distributed storage system. For example, in one embodiment, when the mediator is unavailable and a request to change the status of a CG relationship arrives in one of the clusters, a pending flag may be set for that CG. This pending flag may also be propagated to the peer cluster for that CG. In this manner, consultation of the mediator for consensus may be precluded until this pending flag is cleared.

In the context of various embodiments described herein, a data replication state of InSync or OOS is described as an example of a CG relationship status, it is to be appreciated various other CG relationship status information may be tracked and may represent the change in status event that may trigger the mediator reseed process. For example, in one embodiment, CG relationship status information may include information regarding operation-specific context, a role change (e.g., from primary to secondary or vice versa), the primary distributed storage system becoming OOS, and the secondary distributed storage system becoming OOS.

Mediator Reseed

Figure 8:
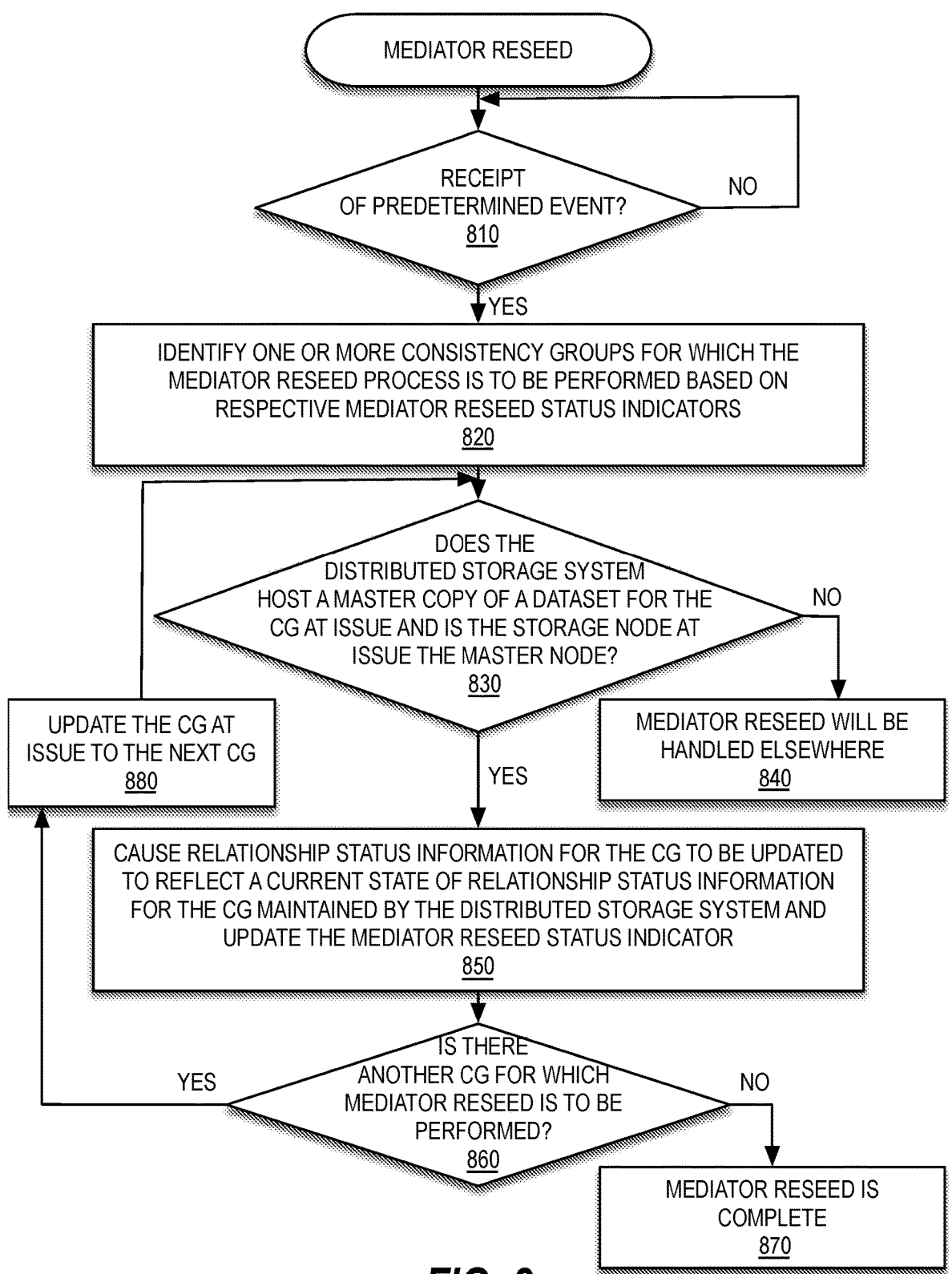
FIG. 8 is a flow diagram illustrating mediator reseed processing in accordance with an embodiment of the present disclosure.

FIG. 8 is a flow diagram illustrating mediator reseed processing in accordance with an embodiment of the present disclosure. At decision block 810, it is determined whether a predetermined event has been received. If so, processing proceeds with block 820; otherwise, processing loops back to decision block 810. Depending upon the particular implementation, the predetermined event may be the automated triggering of the mediator reseed process (e.g., block 670 of FIG. 6) or may be a manual triggering of the mediator reseed process, for example, by an administrator of the cross-site HA storage solution.

At block 820, one or more CGs for which the mediator reseed process is to be performed are identified based on the respective mediator reseed status indicators. As noted above, a mediator reseed status indicator may be set for a given CG to identify whether relationship status information stored on the mediator (e.g., mediator 220) for the given CG is stale. According to one embodiment, the mediator reseed status indicator for the given CG may be set responsive to a change in status of a CG relationship (e.g., the data replication status for the given CG changing from InSync to OOS or from OOS to InSync) for the given CG during unavailability of the mediator. For example, the mediator reseed status indicator for the given CG may be set at block 670 of FIG. 6.

In the context of the present example, mediator reseed processing loops through blocks 830 to 860 for each of the CGs identified at block 820. Because the cross-site distributed HA storage system spans multiple sites, the mediator reseed process is a distributed problem and it may be desirable to preclude multiple simultaneous processes from trying to run the mediator reseed process for a given CG.

According to one embodiment, the particular distributed storage system (e.g., cluster 235 or cluster 245) of the cross-site distributed HA storage system and the particular node (e.g., storage node 236a-n or storage node 246a-n) that is to perform the mediator reseed process is selected at decision block 830. In the context of the present example, at decision block 830, it is determined whether the distributed storage system at issue hosts a master copy of the dataset for the CG at issue and if the storage node at issue is the master node. If so, processing continues with block 850; otherwise, processing branches to block 840.

At block 840, the node of the distributed storage system at issue foregoes performing the mediator reseed process as it will be handled elsewhere as either the node is not the master node or the distributed storage system at issue does not host the master copy of the dataset for the CG at issue.

At block 850, relationship status information at the mediator for the CG is caused to be updated to reflect the current state of the relationship status information for the CG maintained by the distributed storage system at issue and the mediator reseed status indicator is reset. According to one embodiment, the node may first check the data replication status (e.g., InSync or OOS) stored by the mediator for the CG at issue. If the data replication status stored by the mediator differs from that maintained may the distributed storage system, then, the mediator record is patched with the latest state from the distributed storage system. Alternatively, the check may be skipped and the data replication status on the mediator may simply be set to the current state indicated by the CG relationship status stored by the distributed storage system regardless of the state of the CG relationship status stored by the mediator. If the mediator reseed fails at any particular stage, the process may be repeated. After successful completion of the mediator reseed for a given CG, the mediator may be used as an arbiter for the given CG and failover operations for the given CG are permissible.

According to one embodiment, the distributed storage system to which the mediator is reconnected to may perform a different set of operations than the peer distributed storage system and the distributed storage systems may exchange their respective lists of CG relationships (e.g., as generated during the CG relationship tracking of FIG. 7) to be updated to the mediator as described below with reference to FIGS. 9 and 10.

Figure 9:
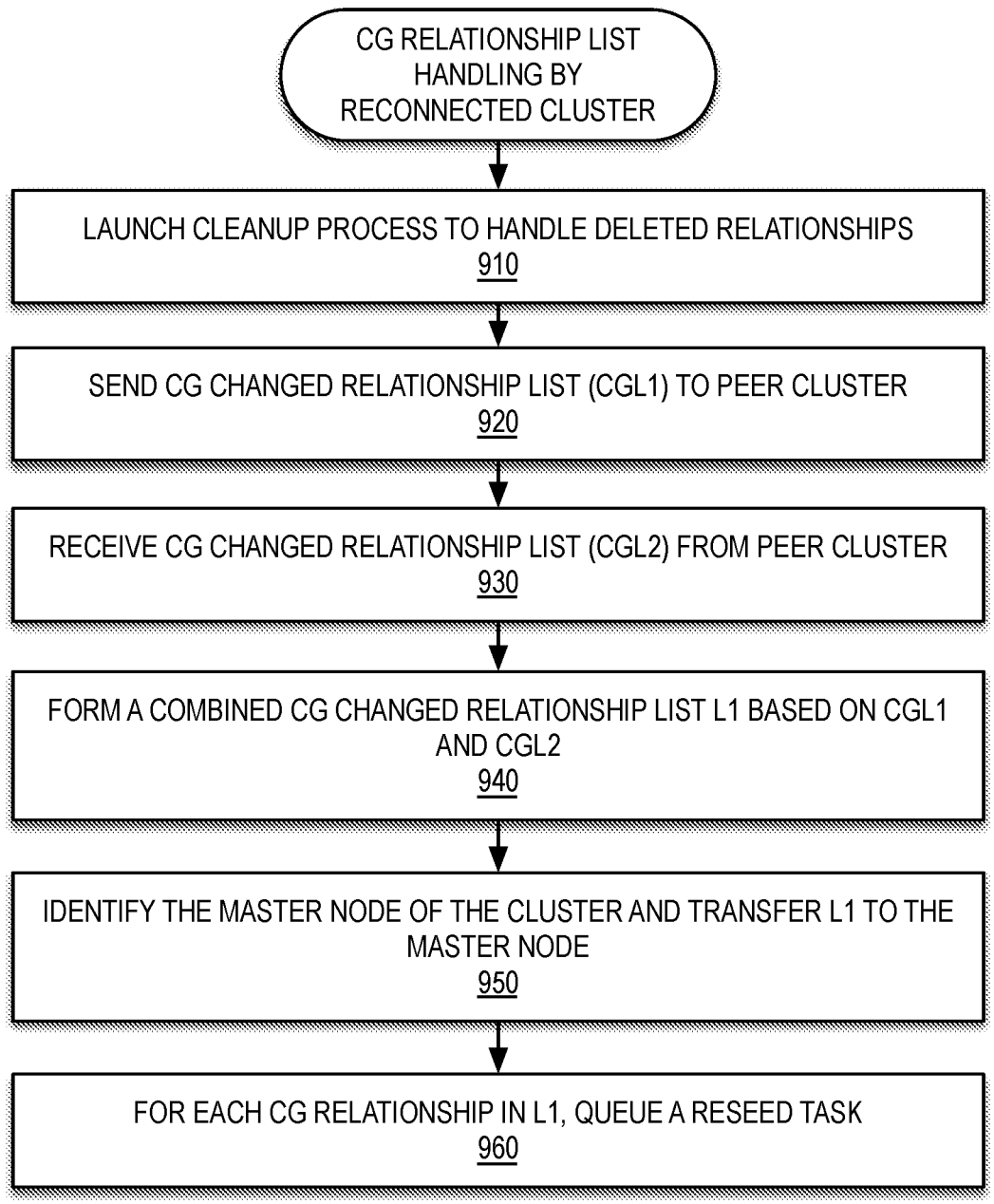
FIG. 9 is a flow diagram illustrating CG relationship list handling by a reconnected cluster in accordance with an embodiment of the present disclosure.

FIG. 9 is a flow diagram illustrating CG relationship list handling by a reconnected cluster in accordance with an embodiment of the present disclosure. In the context of the present example, it is assumed that a mediator (e.g., mediator 220) for one or more CGs associated with a distributed storage system (e.g., cluster 235 or 245) of a cross-site HA storage solution has transitioned from unavailable to available. According to one embodiment, the mediator's changed connectivity status may be detected as a result of a periodic health check as described above with reference to FIG. 6. In such an embodiment, as part of the mediator reseed process triggered by block 650 of FIG. 6, the following relationship list handling may be initiated.

At block 910, a cleanup process is launched to handle deleted CG relationships. A non-limiting example of this cleanup process is described below with reference to FIG. 11. In one embodiment, this cleanup process is run once per peered set of distributed storage systems to focus on verifying and cleaning up CGs associated with that particular pair of distributed storage systems. In an alternative embodiment, the peer of the distributed storage system at issue may instead initiate the cleanup process.

At block 920, a list of CG relationships (CGL1) that have changed during the unavailability of the mediator is sent to the peer distributed storage system. In one embodiment, this list of changed CG relationships is generated as described above with reference to FIG. 7.

At block 930, a list of changed CG relationships (CGL2) generated by the peer distributed storage system during unavailability of the mediator is received by the distributed storage system at issue.

At block 940, a combined list (L1) of CG changed relationships is formed based on CGL1 and CGL2.

At block 950, the master node of the distributed storage system is identified and L1 is transferred to the master node.

At block 960, for each CG relationship in L1, the master node queues a mediator reseed task. In one embodiment, the mediator reseed task includes the various operations described above with reference to FIG. 8. According to one embodiment, the queueing of the mediator reseed task may be performed to serialize operations that might otherwise be attempted to be performed concurrently on CG relationship information. In one embodiment, the reseed task is queued on the monarch node. As noted above, a distributed storage system may contain a number of SVMs (e.g., 511a or 511b). Within a particular CG one volume may be considered the monarch volume. The node within the cross-site HA storage solution that hosts the monarch volume may be considered the monarch node. For purposes of clarifying the difference between a master node and a monarch node, in various embodiments described herein, there is one master node per distributed storage system and one monarch node per CG.

Figure 10:
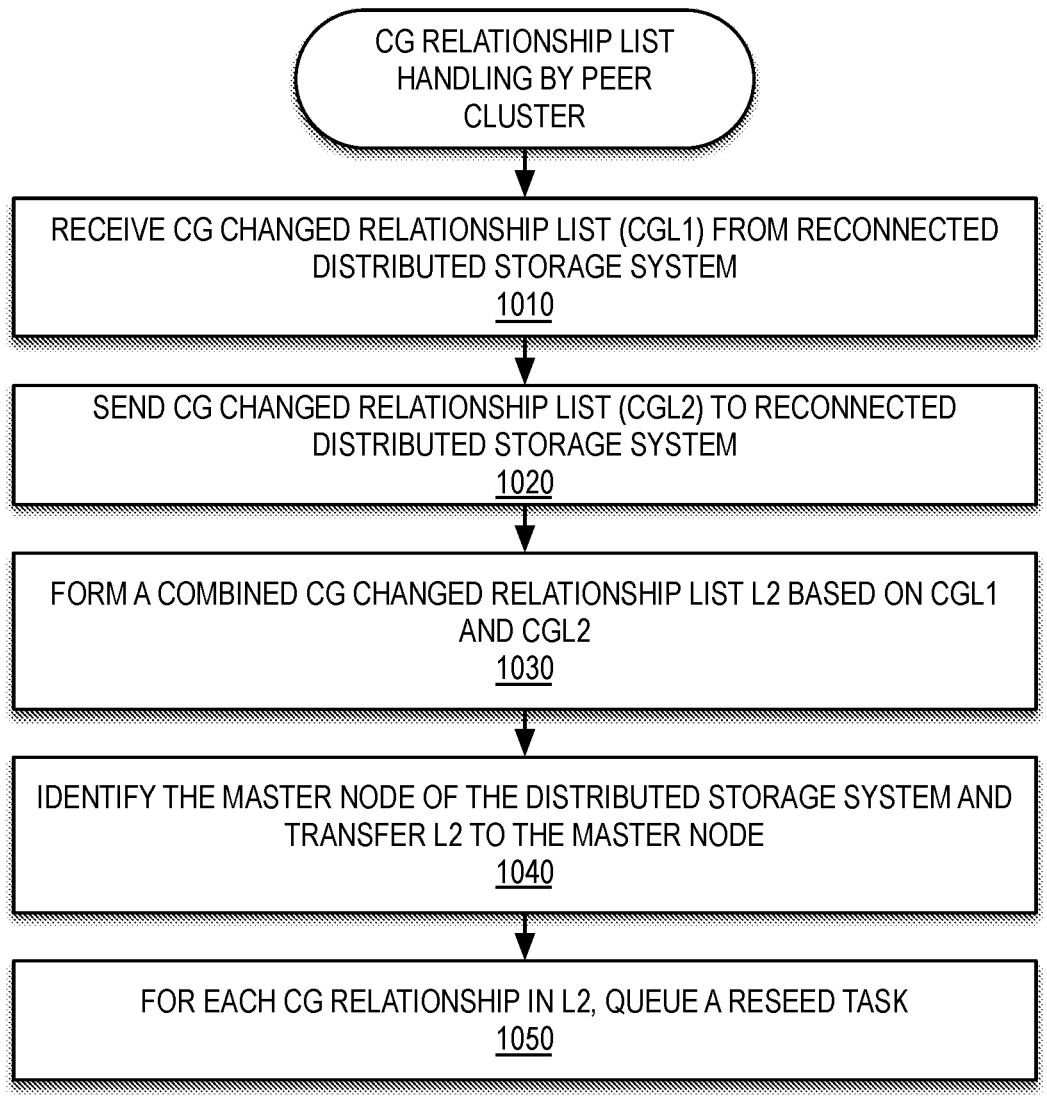
FIG. 10 is a flow diagram illustrating CG relationship list handling by a peer cluster in accordance with an embodiment of the present disclosure.

FIG. 10 is a flow diagram illustrating CG relationship list handling by a peer cluster in accordance with an embodiment of the present disclosure. In the context of the present example, it is assumed that a mediator (e.g., mediator 220) for one or more CGs associated with a distributed storage system (e.g., cluster 235 or 245) of a cross-site HA storage solution has transitioned from unavailable to available and the reconnected distributed storage system has begun the CG relationship list handling process described above with reference to FIG. 9. Depending upon the particular implementation, the reconnected distributed storage system may cause the peer distributed storage system to commence CG relationship list handling of its own. For example, when the connection to the mediator is reestablished by any of the nodes, the CG relationship list handling (e.g., as described above with reference to FIG. 9 may be performed). As part of the CG relationship list handling, the CG changed relationship lists are exchanged between peer distributed storage systems as described further below. In one embodiment, at both distributed storage systems, a consolidated CG changed relationship list may be used to identify the master node, which can trigger the reseed task.

At block 1010, a list of CG relationships (CGL2) that have changed during the unavailability of the mediator is sent to the reconnected distributed storage system. In one embodiment, this list of changed CG relationships is generated as described above with reference to FIG. 7.

At block 1020, a list of changed CG relationships (CGL1) generated by the reconnected distributed storage system during unavailability of the mediator is received by the distributed storage system at issue.

At block 1030, a combined list (L2) of CG changed relationships is formed based on CGL1 and CGL2.

At block 1040, the master node of the distributed storage system is identified and L2 is transferred to the master node.

At block 1050, for each CG relationship in L2, the master node queues a mediator reseed task. In one embodiment, the mediator reseed task includes the various operations described above with reference to FIG. 8. According to one embodiment, the queueing of the mediator reseed task may be performed to serialize operations that might otherwise be attempted to be performed concurrently on CG relationship information. As noted above, in one embodiment, the reseed task is queued on the monarch node for the CG.

Cleanup

Figure 11:
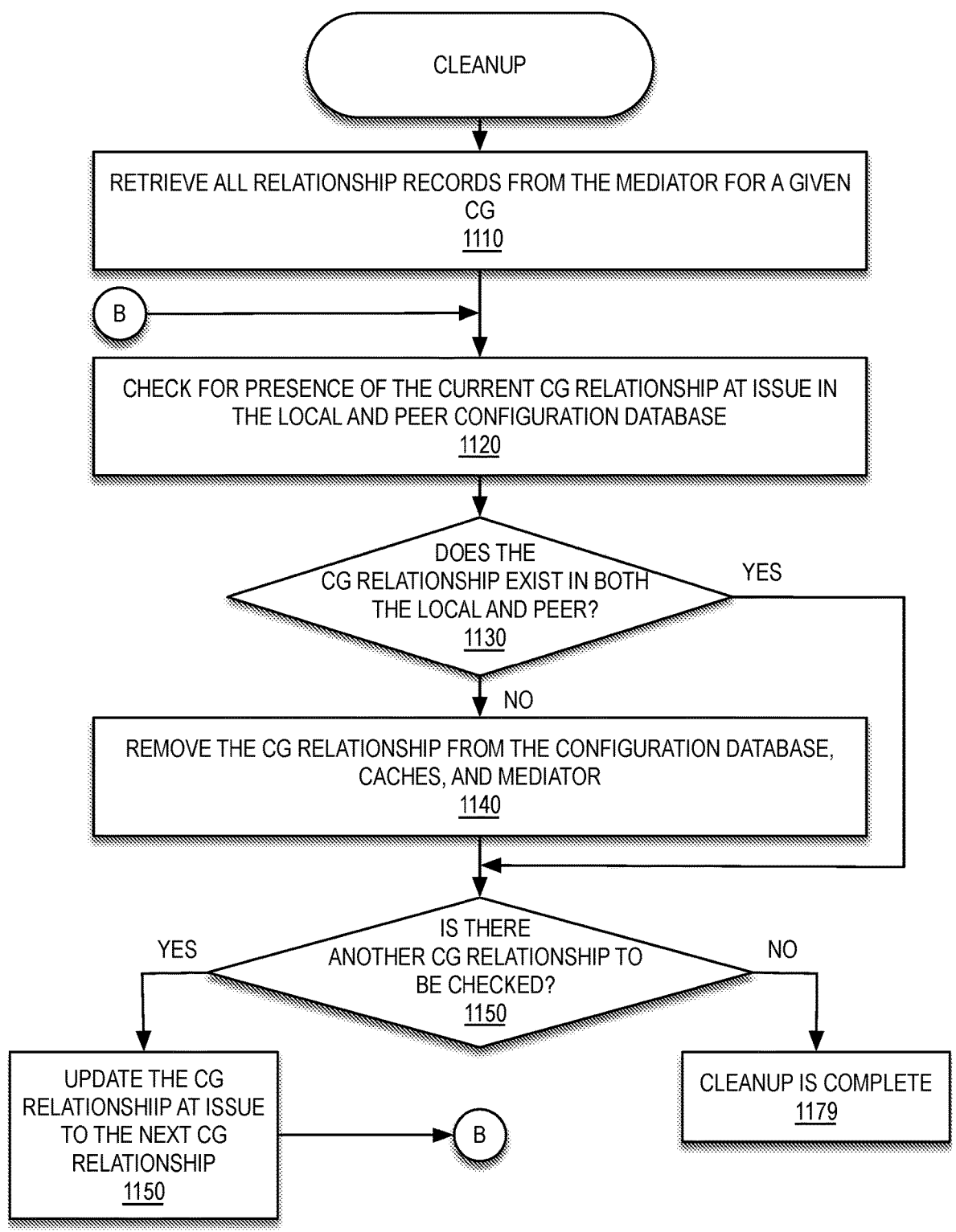
FIG. 11 is a flow diagram illustrating cleanup processing in accordance with an embodiment of the present disclosure.

FIG. 11 is a flow diagram illustrating cleanup processing in accordance with an embodiment of the present disclosure. While a mediator is unavailable, one or more CG relationships and or status information associated with such relationships may have changed. Some of these scenarios (e.g., a change is data replication status) may be addressed by performing a mediator reseed, for example, as described above with reference to FIG. 8. Other scenarios, such as deletion of a CG may be handled by performing the cleanup process described below. According to one embodiment, the cleanup process is performed by one of the pair of peered distributed storage systems at issue. Those skilled in the art will appreciate there are a number of ways to select one of the peered distributed storage systems. In one embodiment, the distributed storage system having a master node with the lowest universally unique identifier (UUID) is selected.

At block 1110, all CG relationship records for the pair of peered distributed storage systems at issue are retrieved from the mediator associated with the pair of peered distributed storage systems. In one embodiment, a mediator may be configured to serve multiple pairs of peered distributed storage systems. In such an embodiment, the use of UUIDs may be used to distinguish among CG records associated with one pair of peered distributed storage systems from another. For purposes of illustration, Table 2 (below) provides an example of CG relationships that may be supported by a mediator that is associated with two different pairs of peered distributed storage systems. Continuing with this example, the first cluster pair A and B may have a mediator configured at a particular IP address, with a UUID of med_uuid_1 and having 3 CG relationships (e.g., $CG_1$, $CG_2$, and $CG_3$). The second cluster pair A and C may also have the same mediator configured at the same IP address, with a UUID of med_uuid_2 and having 4 CG relationships (e.g., $CG_a$, $CG_b$, $CG_c$, and $CG_d$).

TABLE 2

| Example CG Records for a Mediator Supporting Two Different Cluster Pairs | |
|---|---|
| UUID | CG |
| med_uuid_1 | $CG_1$ |
| med_uuid_1 | $CG_2$ |
| med_uuid_1 | $CG_3$ |
| med_uuid_2 | $CG_a$ |
| med_uuid_2 | $CG_b$ |
| med_uuid_2 | $CG_c$ |
| med_uuid_2 | $CG_d$ |

Assuming the CG relationship records are as identified above in Table 2, retrieval of all CG records for the cluster pair A and B involves the distributed storage system retrieving all of the records having a UUID equal to med_uuid_1, which corresponds to $CG_1$, $CG_2$, and $CG_3$.

In the context of the present example, the distributed storage system loops through all of the retrieved CG relationship records in blocks 1120 to 1160 until all the CG relationships have been checked.

At block 1120, the distributed storage system checks for the presence of the current CG relationship at issue in its local configuration database (e.g., RDB 512a) and in the peer configuration database (e.g., RDB 512b).

At decision block 1130, it is determined whether the CG relationship exists in both the local and the peer configuration databases. If so, processing branches to decision block 1150; otherwise, processing continues with block 1140.

At block 1140, the CG relationship is removed from whichever of the local and peer configuration database in which it exists as well as any caches in which this information may have been cached, and from the mediator.

At decision block 1150, it is determined whether there is another CG relationship to be checked. If so, processing continues with block 1160; otherwise, processing branches to block 1170.

At block 1160, the CG relationship at issue is updated to the next CG relationship of those retrieved from the mediator and processing continues with block 1120.

At block 1170, cleanup processing is complete. At this point, any CG relationships that were deleted during mediator unavailability on either of the pair of peered distributed storage systems have now been deleted from the peer configuration database as well as the mediator.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 12:
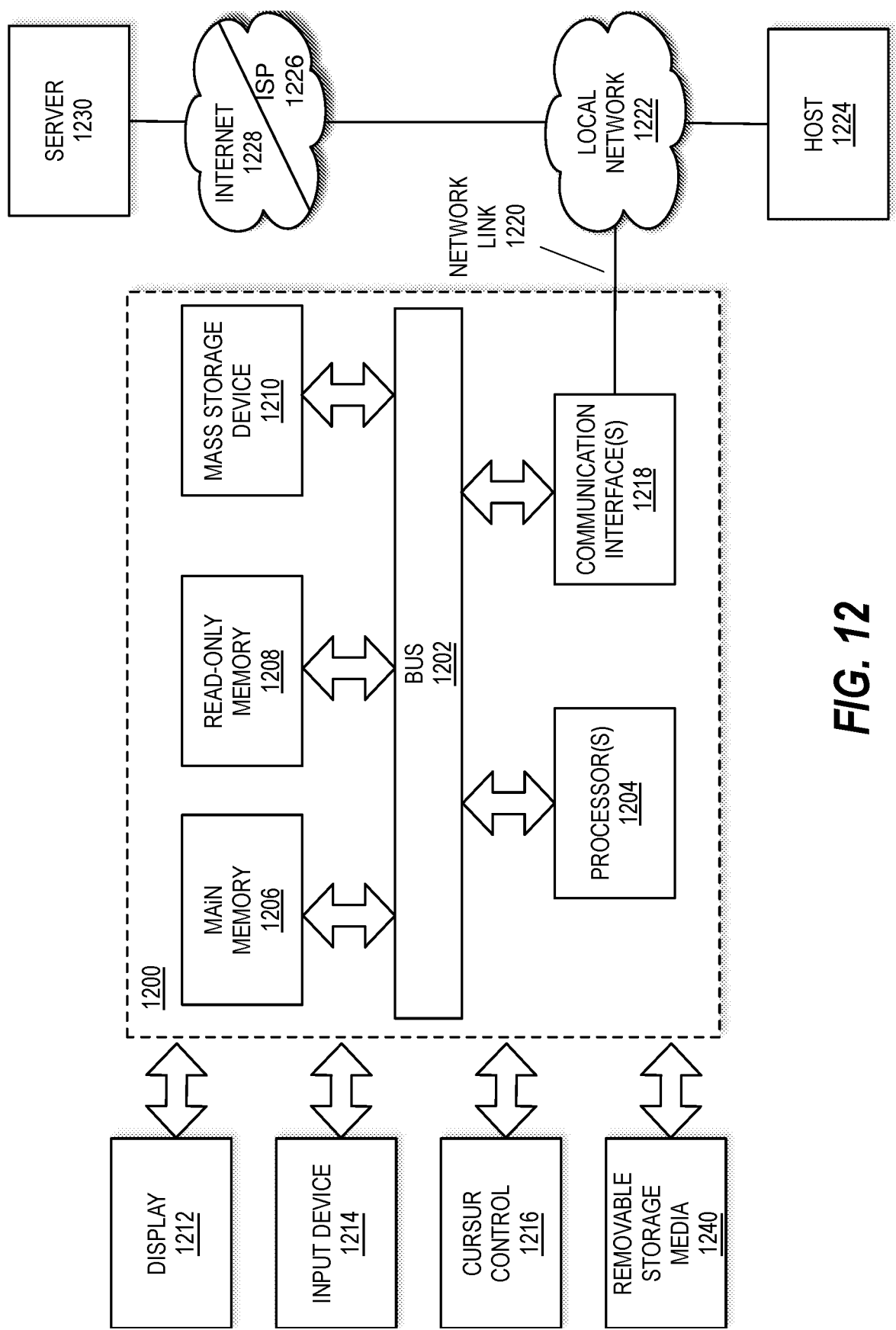
FIG. 12 illustrates an example computer system in which or with which embodiments of the present disclosure may be utilized.

FIG. 12 is a block diagram that illustrates a computer system 1200 in which or with which an embodiment of the present disclosure may be implemented. Computer system 1200 may be representative of all or a portion of the computing resources associated with a node (e.g., storage nodes 136a-n or storage nodes 146a-n) of a distributed storage system (e.g., cluster 235 or 245) or an administrative work station (e.g., computer system 110 or 210). Notably, components of computer system 1200 described herein are meant only to exemplify various possibilities. In no way should example computer system 1200 limit the scope of the present disclosure. In the context of the present example, computer system 1200 includes a bus 1202 or other communication mechanism for communicating information, and a processing resource (e.g., a hardware processor 1204) coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, e.g., a magnetic disk, optical disk or flash disk (made of flash memory chips), is provided and coupled to bus 1202 for storing information and instructions.

Computer system 1200 may be coupled via bus 1202 to a display 1212, e.g., a cathode ray tube (CRT), Liquid Crystal Display (LCD), Organic Light-Emitting Diode Display (OLED), Digital Light Processing Display (DLP) or the like, for displaying information to a computer user. An input device 1214, including alphanumeric and other keys, is coupled to bus 1202 for communicating information and command selections to processor 1204. Another type of user input device is cursor control 1216, such as a mouse, a trackball, a trackpad, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Removable storage media 1240 can be any kind of external storage media, including, but not limited to, hard-drives, floppy drives, IOMEGA® Zip Drives, Compact Disc-Read Only Memory (CD-ROM), Compact Disc—Re-Writable (CD-RW), Digital Video Disk-Read Only Memory (DVD-ROM), USB flash drives and the like.

Computer system 1200 may implement the techniques described herein using customized hard-wired logic, one or more ASICs or FPGAs, firmware or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 1210. Volatile media includes dynamic memory, such as main memory 1206. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218. The received code may be executed by processor 1204 as it is received, or stored in storage device 1210, or other non-volatile storage for later execution.

What is claimed is:

1. A method performed by one or more processors of a distributed storage system, the method comprising:
    determining a mediator associated with a consistency group of the distributed storage system is unavailable;
    determining a change in a data replication status of the consistency group has occurred during unavailability of the mediator;
    adding the changed data replication status to a list of changes to be updated when the mediator becomes available; and
    precluding the mediator from acting as an arbitrator for a failover operation associated with the consistency group until the mediator has been informed of the changed data replication status.

2. The method of claim 1, wherein said determining is performed during a periodic health check of a connectivity status of the mediator.

3. The method of claim 1, wherein the changed data replication status is indicative of the consistency group being out of synchronization with a corresponding consistency group of a remote distributed storage system.

4. The method of claim 1, wherein the changed data replication status is indicative of the consistency group being in synchronization with a corresponding consistency group of a remote distributed storage system.

5. The method of claim 1, wherein the changed data replication status is due to a member volume of the consistency group being unreachable.

6. The method of claim 1, wherein said precluding includes setting a flag indicative of a need for the data replication status maintained by the mediator to be updated.

7. A distributed storage system comprising:
    one or more processors; and
    a non-transitory computer-readable medium, coupled to the one or more processors, having stored therein instructions that when executed by the one or more processors cause the distributed storage system to:
    determine a mediator associated with a consistency group of the distributed storage system is unavailable;

determine a change in a data replication status of the consistency group has occurred during unavailability of the mediator;

add the changed data replication status to a list of changes to be updated when the mediator becomes available; and preclude the mediator from acting as an arbitrator for a failover operation associated with the consistency group until the mediator has been informed of all of the changes.

8. The distributed storage system of claim 7, wherein determination unavailability of the mediator is performed during a periodic health check of a connectivity status of the mediator.

9. The distributed storage system of claim 7, wherein the changed data replication status is indicative of the consistency group being out of synchronization with a corresponding consistency group of a remote distributed storage system or in synchronization with the corresponding consistency group.

10. The distributed storage system of claim 9, wherein the distributed storage system and the remote distributed storage system are part of a cross-site high-availability storage solution or a cross-site disaster recovery storage solution.

11. The distributed storage system of claim 7, wherein the changed data replication status is due to a member volume of the consistency group being unreachable.

12. The distributed storage system of claim 11, wherein the distributed storage system and the remote distributed storage system are part of a cross-site high-availability storage solution or a cross-site disaster recovery storage solution.

13. The distributed storage system of claim 7, wherein precluding the mediator from acting at the arbitrator includes maintaining a mediator reseed status indicator for the consistency group indicative of whether data replication status information maintained by the mediator for the consistency group is stale.

14. A non-transitory computer-readable storage medium embodying a set of instructions, which when executed by one or more processors of a distributed storage system, cause the distributed storage system to:

determine a mediator associated with a consistency group of the distributed storage system is unavailable;

determine a change in a data replication status of the consistency group has occurred during unavailability of the mediator;

add the changed data replication status to a list of changes to be updated when the mediator becomes available; and preclude the mediator from acting as an arbitrator for a failover operation associated with the consistency group until the mediator has been informed of all of the changes.

15. The non-transitory computer-readable storage medium of claim 14, wherein determination unavailability of the mediator is performed during a periodic health check of a connectivity status of the mediator.

16. The non-transitory computer-readable storage medium of claim 14, wherein the changed data replication status is indicative of the consistency group being out of synchronization with a corresponding consistency group of a remote distributed storage system or in synchronization with the corresponding consistency group.

17. The non-transitory computer-readable storage medium of claim 16, wherein the distributed storage system and the remote distributed storage system are part of a cross-site high-availability storage solution or a cross-site disaster recovery storage solution.

18. The non-transitory computer-readable storage medium of claim 14, wherein the changed data replication status is due to a member volume of the consistency group being unreachable.

19. The non-transitory computer-readable storage medium of claim 18, wherein the distributed storage system and the remote distributed storage system are part of a cross-site high-availability storage solution or a cross-site disaster recovery storage solution.

20. The non-transitory computer-readable storage medium of claim 14, wherein precluding the mediator from acting at the arbitrator includes maintaining a mediator reseed status indicator for the consistency group indicative of whether data replication status information maintained by the mediator for the consistency group is stale.

* * * * *